(12) United States Patent
Roche

(10) Patent No.: US 11,905,901 B2
(45) Date of Patent: Feb. 20, 2024

(54) SYSTEM FOR IMPROVED STARTING OF A POWERED DEVICE INCLUDING ONE OR MORE THRESHOLD CONDITIONS

(71) Applicant: Walbro LLC, Tucson, AZ (US)

(72) Inventor: Bradley J. Roche, Millington, MI (US)

(73) Assignee: Walbro LLC, Cass City, MI (US)

( * ) Notice: Subject to any disclaimer, the term of this patent is extended or adjusted under 35 U.S.C. 154(b) by 222 days.

(21) Appl. No.: 17/280,951

(22) PCT Filed: Oct. 14, 2019

(86) PCT No.: PCT/US2019/056037
§ 371 (c)(1),
(2) Date: Mar. 29, 2021

(87) PCT Pub. No.: WO2020/081413
PCT Pub. Date: Apr. 23, 2020

(65) Prior Publication Data
US 2021/0340926 A1    Nov. 4, 2021

Related U.S. Application Data

(60) Provisional application No. 62/746,211, filed on Oct. 16, 2018.

(51) Int. Cl.
*F02D 41/06* (2006.01)
*B60K 35/00* (2006.01)
(Continued)

(52) U.S. Cl.
CPC ............ *F02D 41/062* (2013.01); *B60K 35/00* (2013.01); *B60N 2/002* (2013.01);
(Continued)

(58) Field of Classification Search
CPC ... F02D 41/062; F02D 41/0002; B60K 35/00; B60K 2370/12; B60K 2370/152;
(Continued)

(56) References Cited

U.S. PATENT DOCUMENTS

| 2003/0023352 A1* | 1/2003 | Ogino | G01C 21/36 |
| | | | 701/1 |
| 2010/0114464 A1* | 5/2010 | Miller | B60K 28/04 |
| | | | 701/113 |

(Continued)

FOREIGN PATENT DOCUMENTS

| JP | 2016200038 A | 12/2016 |
| WO | WO2013100260 A2 | 7/2013 |

OTHER PUBLICATIONS

Written Opinion & International Search Report for PCT/US2019/056037 dated Jan. 31, 2020, 11 pages.

*Primary Examiner* — Sizo B Vilakazi
(74) *Attorney, Agent, or Firm* — Reising Ethington P.C.

(57) ABSTRACT

In at least some implementations, a system for communicating threshold conditions for use of a powered device to a user, includes an engine, a controller coupled to the engine to control starting of the engine and a first indicator associated with a first threshold condition. The first indicator has a first state when the threshold condition is not satisfied and the first indicator has a second state when the threshold condition is satisfied, and the first indicator is coupled to the controller so that the controller is responsive to a change of the state of the first indicator, and wherein the controller is adapted to provide information for display that is indicative of the state of the first indicator.

15 Claims, 2 Drawing Sheets

(51) Int. Cl.
*B60N 2/00* (2006.01)
*F02D 41/00* (2006.01)

(52) U.S. Cl.
CPC ...... *F02D 41/0002* (2013.01); *B60K 2370/12* (2019.05); *B60K 2370/152* (2019.05); *B60K 2370/171* (2019.05)

(58) Field of Classification Search
CPC ............ B60K 2370/171; B60K 28/063; B60K 2370/131; B60K 2370/1438; B60K 2370/162; B60K 2370/168; B60K 2370/172; B60K 2370/197; B60K 2370/566; B60N 2/002; F02N 11/0803; F02N 2200/106; B60W 2050/146; B60W 10/06; B60W 50/14; B60Y 2200/223
See application file for complete search history.

(56) References Cited

U.S. PATENT DOCUMENTS

| | | | | |
|---|---|---|---|---|
| 2014/0190046 A1* | 7/2014 | Shibata | ................... | E02F 9/264 |
| | | | | 701/50 |
| 2016/0170494 A1* | 6/2016 | Bonnet | ................. | B60K 35/00 |
| | | | | 345/173 |
| 2018/0146519 A1* | 5/2018 | Osumi | ................... | G02B 30/26 |
| 2019/0376483 A1* | 12/2019 | Khafagy | ................ | F02N 15/06 |
| 2020/0047743 A1* | 2/2020 | Burt | ...................... | B60W 10/30 |
| 2020/0277923 A1* | 9/2020 | Dixon | ................... | F02D 41/064 |

* cited by examiner

SYSTEM FOR IMPROVED STARTING OF A POWERED DEVICE INCLUDING ONE OR MORE THRESHOLD CONDITIONS

REFERENCE TO RELATED APPLICATIONS

This application claims the benefit of U.S. Provisional Application Ser. No. 62/746,211 filed on Oct. 16, 2018 the entire contents of which are incorporated herein by reference in its entirety.

TECHNICAL FIELD

The present disclosure relates generally to engine powered devices having one or more threshold conditions to satisfy prior to starting the engine and/or using the device.

BACKGROUND

Some powered devices, like a riding lawnmower or tractor, have threshold conditions that must be satisfied prior to starting an engine of the device. For example, a transmission might need to be in a certain gear or state, a throttle actuator might need to be in a certain position and a brake pedal may need to be depressed or actuated. Other threshold conditions might be needed in different applications. A user can have difficulty starting the engine because the user might not know of all threshold conditions required to start the engine, or the user might incorrectly believe that all threshold conditions have been satisfied. Figuring out what threshold condition has not been met or if the engine is simply not starting properly can be especially difficult and frustrating for a user.

SUMMARY

In at least some implementations, a system for communicating threshold conditions for use of a powered device to a user, includes an engine, a controller coupled to the engine to control starting of the engine and a first indicator associated with a first threshold condition. The first indicator has a first state when the threshold condition is not satisfied and the first indicator has a second state when the threshold condition is satisfied, and the first indicator is coupled to the controller so that the controller is responsive to a change of the state of the first indicator, and wherein the controller is adapted to provide information for display that is indicative of the state of the first indicator.

The system may include a second indicator associated with a second threshold condition. The second indicator may have a first state when the second threshold condition is not satisfied and the second indicator may have a second state when the second threshold condition is satisfied, and the second indicator may be coupled to the controller so that the controller is responsive to a change of the state of the second indicator, and wherein the controller is adapted to provide information for display that is indicative of the state of the second indicator.

In at least some implementations, the powered device or system may include a seat and the first indicator may be associated with the seat such that the first indicator is in the first state when the seat is not occupied by a user and the first indicator is in the second state when the seat is occupied by the user. In at least some implementations, the powered device or system includes a throttle control movable between a first position and a second position, and the first indicator may be associated with the throttle control and the first indicator is in the first state when the throttle control is in the first position and the first indicator is in the second state when the throttle control is in the second position. The first position may permit powered movement of the device and the second position may be a neutral position wherein the throttle control does not cause movement of the powered device.

In at least some implementations, an electronic device having a display is connected with the controller to provide visual information from the controller. The display includes an icon having a first state when the first indicator is in the first state and the icon has a second state when the first indicator is in the second state. The state of the icon provides information to a user as to, for example, whether or not a threshold condition has been satisfied for some operation of the powered device, for example starting the engine or forward movement of the device.

In at least some implementations, a start input is provided that is not enabled when the threshold condition is not satisfied and is enabled when the threshold condition is satisfied. Multiple indicators may be provided and each indicator may be associated with a different threshold condition, and the start input is not enabled when any one of the threshold conditions is not satisfied and is enabled when all threshold conditions are satisfied.

An electronic device having a display may be connected with the controller to provide visual information from the controller and the display may include an icon for each of the multiple indicators, and each icon has a first state when the first indicator is in the first state and the icon has a second state when the first indicator is in the second state. In at least some implementations, one of the multiple icons visually looks like the seat and wherein the icon that looks like the seat is in the first state when the seat is not occupied by a user and the icon that looks like the seat is in the second state when the seat is occupied by the user, or one of the multiple icons visually looks like the throttle lever and wherein the icon that looks like the throttle lever is in the first state when the throttle lever is in a first position and the icon that looks like the throttle lever is in the second state when the throttle lever is in a second position. The display may be part of a mobile, handheld device or a device that is fixed to the powered device, and which is coupled to the controller via one or more wires or wirelessly.

In at least some implementations, the first indicator is responsive to the position of a key which is movable from a first position in which the threshold condition is not satisfied to a second position in which the threshold condition is satisfied.

In at least some implementations, a method of controlling starting of an engine of or powered moving a powered device, includes the steps of:
  providing at least one indicator associated with a threshold condition, the indicator having a first state when the threshold condition is not satisfied and a second state when the threshold condition is satisfied;
  determining the state of the indicator at a controller coupled to the engine to control at least one parameter of engine operation;
  communicating the state of the indicator to an electronics device having a display;
  visually depicting the state of the indicator on the display with an icon having a first state when the indicator is in the first state and a second state when the indicator is in the second state; and changing the state of the icon when the state of the switch changes as communicated from the controller to the electronics device.

In at least some implementations, a step of wirelessly coupling the electronics device to the controller is used and wherein the communication between the controller and the electronics device occurs wirelessly. The indicator may be a switch or sensor having two positions or states.

In at least some implementations, the method also includes presenting a start input that initiates an engine starting attempt when the threshold condition is satisfied. In at least some implementations, there are multiple threshold conditions and at least one indicator associated with each threshold condition, and wherein the start input is presented only when all threshold conditions are satisfied as determined by the state of the indicators.

BRIEF DESCRIPTION OF THE DRAWINGS

The following detailed description of certain embodiments and best mode will be set forth with reference to the accompanying drawings, in which.

DETAILED DESCRIPTION

Figure 1:
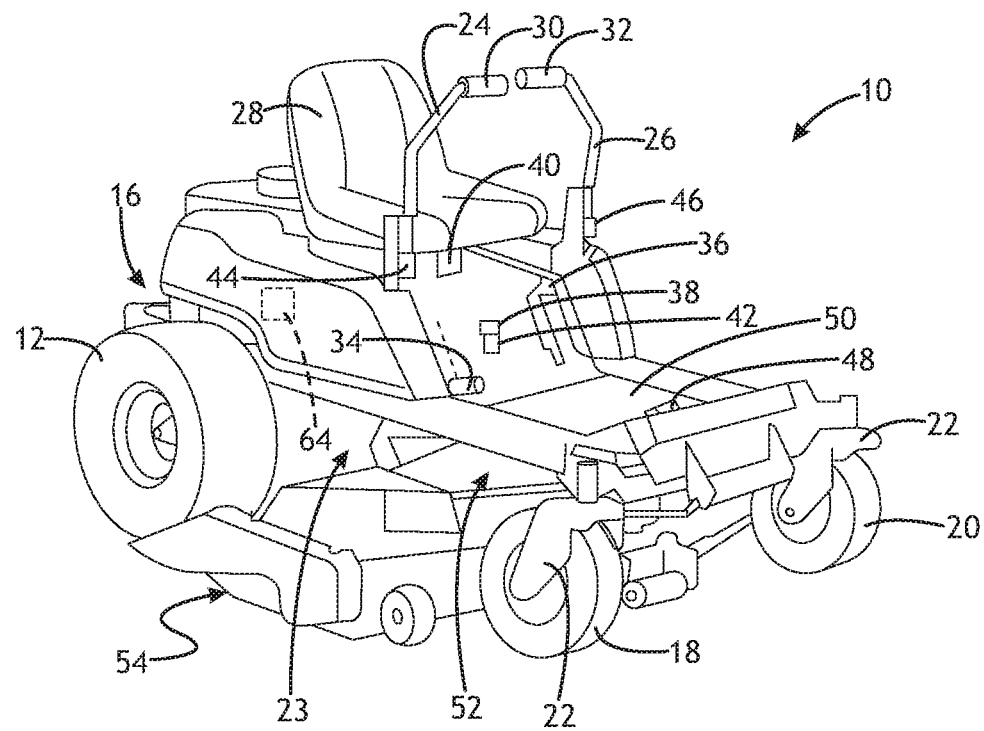
FIG. 1 is a perspective view of a riding lawn mower showing throttle levers in a first position in which the mower may be powered forward and reverse.
Figure 2:
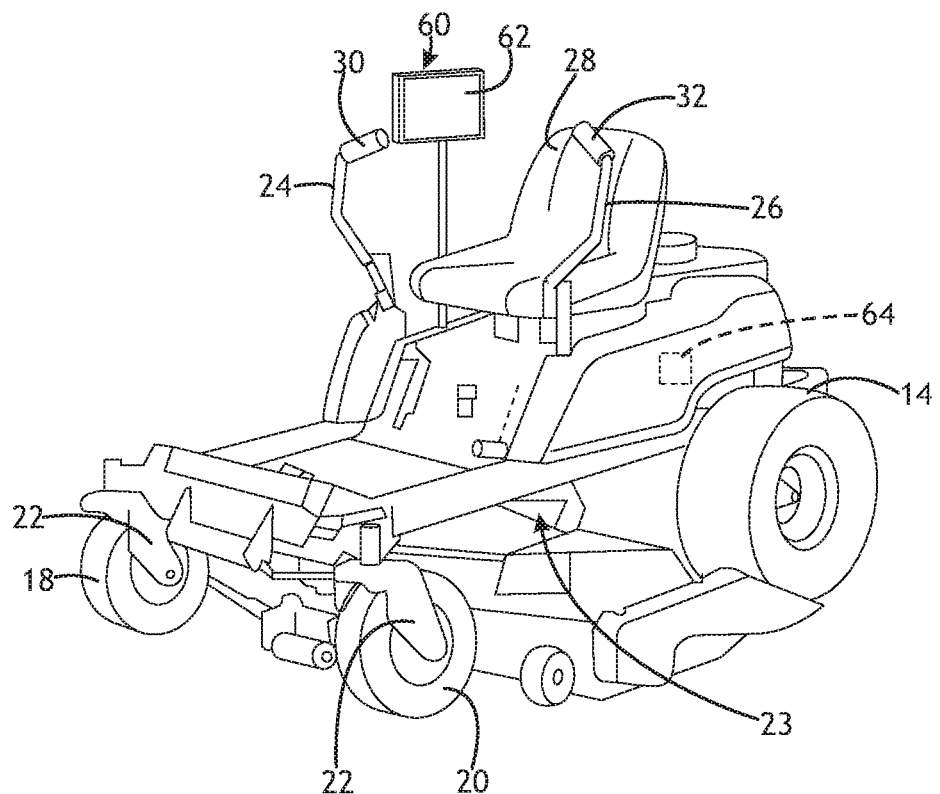
FIG. 2 is a perspective view of a riding lawn mower showing the throttle levers in a second, neutral gear position.

Referring in more detail to the drawings, FIGS. 1 and 2 illustrate a powered device shown as a riding lawn mower 10, sometimes called a zero turn mower because of their very small to non-existent turning radius. The mowers 10 typically have four wheels with two rear wheels 12, 14 driven by a prime mover 16 and two front wheels 18, 20 that are typically not driven by the prime mover 16 and may be mounted on swivels 22 for enhanced turning. The rear wheels 12,14 may be driven and rotated independently of each other, and may be rotated in opposite directions to permit the mower 10 to rotate or turn around a midpoint between the rear drive wheels 12, 14 (sometimes called a Z-turn). When one rear wheel 12 is driven while the other rear wheel 14 is stationary, the mower 10 rotates around the stationary wheel 14. By driving one rear wheel more than the other, the mower can turn in a circle of any desired radius. Straight forward motion is achieved by driving both rear wheels 12, 14 forward with the same power, and likewise, the mower 10 can be driven straight or along any desired radius in reverse by so driving the rear wheels. Thus, steering of the mower 10 is achieved by controlling the rotational driving of the rear wheels 12, 14 rather than by steering the front wheels 18, 20 with a steering wheel or the like.

The prime mover 16 for the rear wheels 12, 14 may be driven by a hydraulic, electric or electrically assisted hydraulic power source or sources. The power source may be separately controlled from the engine 23 or motor that rotates the cutting blade(s) of the lawn mower 10. At least some such mowers 10 have two throttle levers 24, 26 that define a throttle control operable by the user and which are coupled to the wheel driving power source(s). A first throttle lever 24 is actuated to control rotation of a first one of the rear wheels 12 and a second throttle lever 26 is actuated to control rotation of a second one of the rear wheels 14. Moving a throttle lever 24 or 26 forward drives the associated wheel 12 or 14 for forward rotation and pulling a throttle lever 24 or 26 backward drives the associated wheel 12 or 14 for backward rotation. In some applications, as shown in FIGS. 1 and 2, the throttle levers 24, 26 may be angled or bent so that, in use, the throttle levers 24, 26 are over the lap of a user seated in a seat 28 of the mower (FIG. 1), and the throttle levers 24, 26 can be pivoted or otherwise moved outwardly in opposite directions away from the seat 28 to permit the user to exit and enter the seat (FIG. 2). Hence, the throttle levers 24, 26 can pivot about a first axis for forward/reverse powered movement of the rear wheels 12, 14 and the throttle levers 24, 26 can pivot outwardly and inwardly relative to the seat 28 about a second axis that is not parallel to and may be perpendicular to the first axis. Such outward movement of the throttle levers 24, 26 may put the wheel drive mechanisms into neutral and/or apply a brake or clutch to inhibit or prevent powered driving of the rear wheels 12, 14. Instead of the throttle levers 12, 14, some zero turn mowers are steered by a joystick or a steering wheel instead of the dual throttle levers.

As noted above, the mowers 10 also typically include the seat 28 and the throttle levers 24, 26 have free ends or handles 30, 32 arranged to be manipulated by a driver seated in the seat 28. The mower's engine throttle may be controlled separately, such as by a transmission shifter or throttle lever 34 which may be moved from an idle position to a higher speed position or higher gear for active lawn mowing. The mower 10 may include a parking brake 36 to inhibit rolling of the mower 10 when shut off and stored or parked. And the mower 10 may include a key 38 used to start the engine by turning the key from an off position to a starting position, or turned to a starting position that instead of actually starting the engine merely enables starting of the engine by pushing a button or performing some other action.

In addition, the mower 10 may include one or more threshold conditions at least one of which must be satisfied prior to starting the engine 23 and/or drivingly moving the mower. The threshold conditions may include, for example, settings, component states and/or user actions required before the engine is started and the mower is used. By way of one non-limiting example, the mower may include a first indicator 40, such as a switch or sensor, having a first state when a user is not present in the seat 28 and a second state when the user is present in the seat 28 (e.g. when a weight sufficient to change the state of the switch 40 is present in the seat 28). In at least some implementations, a pre-starting condition of the engine 16 is that the seat switch 40 is in the second state indicating that the user is seated in the seat 28 and in position to start the engine 23 and command the mower 10. Another non-limiting example of a threshold condition is a requirement that the key 38 be moved from an off position to a starting position, which may be detected by a second indicator 42 associated with a key cylinder, e.g. a second switch or sensor. Another non-limiting example of a pre-starting condition is a requirement that both throttle levers 24, 26 be moved to the neutral position. A third indicator 44 may be associated with the first throttle lever 24 and a fourth indicator 46 may be associated with the second throttle lever 26. By way of another non-limiting example, the mower 10 may include one or more indicators (e.g. switches or sensors indicated at 48 in FIG. 1) actuated by a user's foot or feet placed on an upper surface 50 of a deck 52 of the mower 10 (e.g. above a cutting deck 54 and mowing blades) to indicate a proper position of the users feet and legs for operation of the mower 10. Actuation of the foot switch(es)/sensor(s) 48 may be a pre-starting condition, if desired. Of course, other sensors, switches or component positions and user actions may be used as indicators for threshold, pre-starting conditions, or as conditions to initial movement of the mower 10 after starting the engine 23, and these threshold conditions may be used in any desired combination.

If one or more required threshold conditions is/are not satisfied, then the attempted action (e.g. starting the engine 23 or moving the mower 10) cannot be achieved. Users of the mower 10 may be unaware of or forget one or more of the actions needed to be taken prior to the attempted action and/or a fault may occur in a switch, sensor or component that prevents proper determination of a satisfied threshold condition may prevent the attempted action even if the user has satisfied the threshold condition(s). Either circumstance can make it difficult for a user to determine why the engine 23 cannot be started or the mower 10 cannot be moved.

To assist the user in completing the one or more threshold conditions, the mower 10 may include or be connected to an electronic device 60 (FIG. 2) having a display 62 upon which information and/or one or more selectable inputs may be provided to the user. The device 60 may be mounted to the mower 10 in an at least somewhat permanent manner (e.g. not intended to be removed by the user between uses, or otherwise, except to service the mower or electronic device/display) or in a temporary and removable manner to permit the user to remove the electronic device 60 when desired. One example of an electronic device 60 is a LCD screen that is part of the mower 10, mounted thereto in an at least somewhat permanent manner and coupled to a controller 64 or microprocessor of the mower 10 by one or more wires, or wirelessly. Another example of an electronic device 60 is a portable device like a mobile phone or tablet that may be releasably mounted to the mower 10 and coupled to the mower's controller 64 by one or more wires or wirelessly. The wireless communication may be achieved using any desired wireless protocol, including but not limited to 802.11, other WLAN specifications, WPA, WEP, wireless broadband, Bluetooth or BLE protocol and Wi-fi communication protocols. Such portable electronic devices 60 typically have memory on which one or more software programs may be stored to control communication between the mower controller 64 and the electronic device 60, and may have a separate power source such as a battery or may be powered by the electrical power source of the apparatus (at least temporarily). The mower controller 64 may include one or more microprocessors and related circuit(s) to monitor and control one or more engine or mower operating parameters, such as engine ignition timing, the fuel/air ratio of a fuel mixture delivered to the engine, engine throttle position, engine speed, activation of accessories like a seat warmer, throttle handle warmers, lights, monitoring of various sensors or switches, etc.

Via wired or wireless connection, information may be passed between the mower controller 64 and the electronic device 60. Such information may include engine operational or situational data such as the current time, engine temperature, engine oil life, engine oil temperature, ambient temperature, engine running time since most recent starting event, total engine running time, current engine speed, maximum engine speed, a tachometer or engine speed range, a warning or cautionary message to the user, a recommendation to the user, a current operating mode (e.g. sport, economy, etc), apparatus ground speed or the like. The controller 64 may also be responsive to actuation of one or more of the indicators 40-46, e.g. a change of state of a switch or the electrical output of one or more sensors, or the position of one or more components, that are threshold conditions. Such indicators 40-46 may be electrically coupled to the controller 64 via one or more wires or wirelessly. The state of such indicators 40-46 indicates the state of the corresponding or associated threshold conditions, e.g. satisfied or not satisfied, may be communicated with and displayed by the electronic device 60 to inform the user.

In at least some implementations, the device 60 via its display may provide a threshold condition window or screen that indicates the state of one or more threshold conditions. In the example shown in FIGS. 3-6, the threshold condition screen appears upon determination that the user desires to start the engine 23. This may appear when the device 60 is first wirelessly paired with the mower controller 64, or when the key 38 is turned from an off position, or when some other user action has occurred. By whatever means the threshold condition screen occurs, the display 62 may include text or graphics that indicate the state of one or more threshold conditions to the user. In the example of FIG. 1, the mower 10 includes a first threshold condition that the seat switch 40 is in the second state indicating presence of a user within the seat 28, a second threshold condition that the first throttle lever 24 be in the neutral position and a third threshold condition that the second throttle lever 26 also be in the neutral position. When all three threshold conditions are satisfied, the engine 23 may be started.

Figure 3:
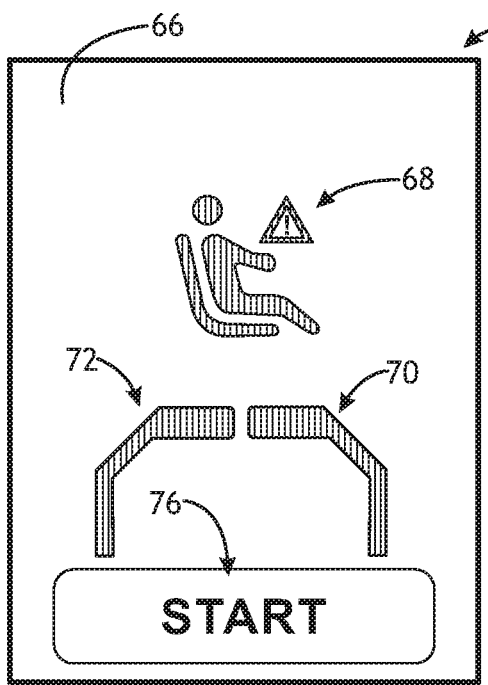
FIGS. 3-6 illustrate representative displays of an electronic device that may be provided to a user to indicate the satisfaction of one or more pre-starting conditions
Figure 4:
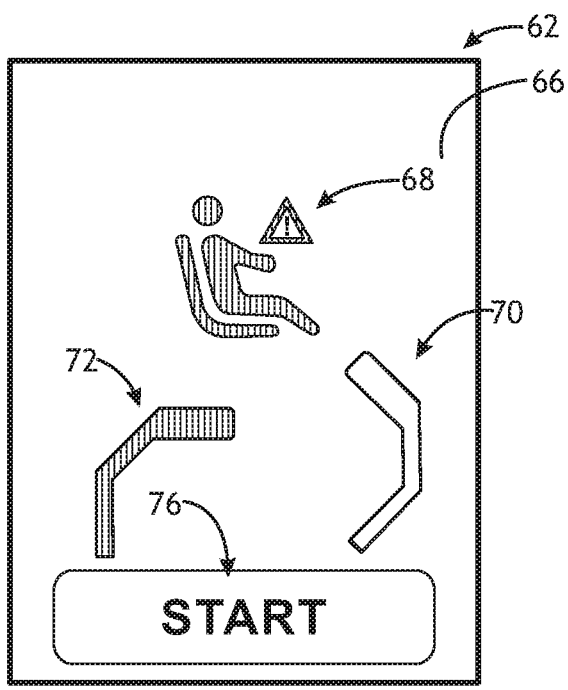
Figure 5:
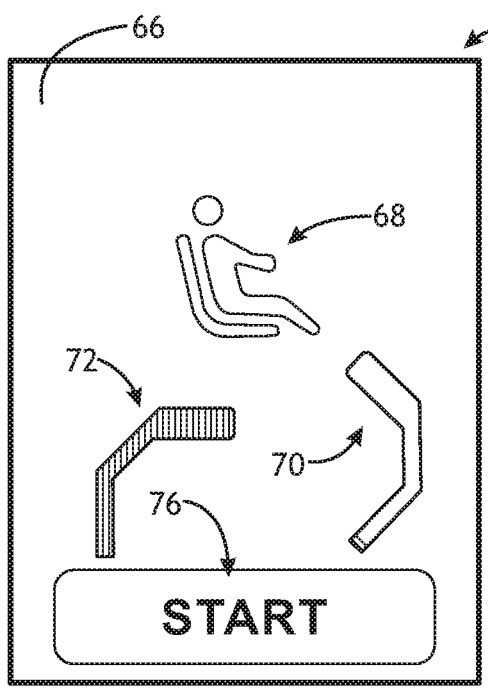
Figure 6:
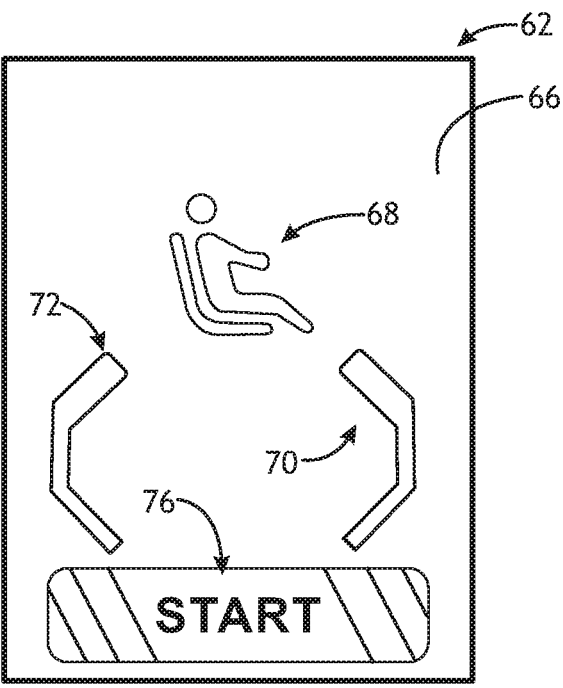

As shown in FIG. 3, the threshold condition screen 66 includes a first icon 68 that indicates the state of the seat switch 40, a second icon 70 that indicates the state of the first throttle lever 24 and a third icon 72 that indicates the state of the second throttle lever 26. Of course, more or fewer threshold conditions could be used and associated icons displayed on the threshold condition screen. The first icon 68 has a first state when the seat switch 40 is in the first state and a second state when the seat switch 40 is in the second state. In one embodiment, the first icon 68 is red in color and/or includes a warning sign (e.g. an exclamation point within a triangle as shown in FIGS. 3 and 4) when the seat switch 40 is in the first state and the first icon is green and/or does not include the warning sign when the seat switch is in the second state (as shown in FIGS. 5 and 6). The second icon 70 has a first state when the first throttle lever 24 is not in the neutral position and a second state when the first throttle lever 24 is in the neutral position. And the third icon 72 has a first state when the second throttle lever 26 is not in the neutral position and a second state when the second throttle lever 26 is in the neutral position. The second and third icons 70, 72 may have similar first and second states as they relate to similar mechanisms, namely, the throttle levers. In the illustrated embodiment, the first state for the second and third icons 70, 72 is a first position and first color and the second state is a second position that is different from the first position and a second color that is different than the first color, as can be seen by comparison of FIGS. 3 and 6. Of course, either the position or color may be the same, or a different state or property detectable by the user may be used for any of the icons.

In the illustrated embodiment, first icon 68 looks like a seat and/or a user in a seat and the second and third icons 70, 72 look like throttle levers. That is, the icons have a similar shape and orientation on the display as the actual threshold conditions to which they are associated to visually mimic the threshold condition and improve user comprehension. In their first positions, the second and third icons are arranged on the display 62 as the throttle levers 24, 26 are when ready for use, that is, pivoted inwardly toward each other. And in the second position, the throttle lever icons 70, 72 are moved outwardly from each other representing the position and orientation of the throttle levers 24, 26 when in their neutral positions. This visual representation of the throttle lever position can help a user remember to move the throttle levers 24, 26 to neutral prior to starting the engine 23.

The electronic device 60 may also include one or more inputs or sensors/switches that can be manually actuated by the user, such as by touching a touch-sensitive display. The input(s) may comprise a threshold condition, or the input(s) could cause some action to occur, such as starting the engine or stopping a running engine, or permitting the user to change the displayed information by selecting among menu options, for example. In the example shown, the threshold condition screen 66 includes a start button 76 that when pressed, sends a signal to the engine controller 64 or an engine starting unit to attempt to start the engine 23. Until the required threshold conditions are satisfied, however, pushing the start button 76 will not result in an attempted engine start. To prevent the user from trying to start the engine 23 prior to satisfying the threshold conditions, the start button 76 is either not displayed or is inactive (i.e. grayed out and not ready for actuation by the user). Thus, the input 76 also has a first state in which the input 76 cannot be selected or actuated and a second state in which the input can be selected or actuated by the user. An example of this is shown by comparison of FIGS. 3-5 and FIG. 6, which are further explained below.

In FIG. 3, none of the threshold conditions is satisfied, each of the three icons 68-72 is shown in its first state and the start button 76 is also in its first state. In FIG. 4, the first throttle lever 24 has been moved to neutral, but the seat switch 40 is in the first state and the first throttle lever 24 is not in neutral. Thus, only the second icon 70 is in its second state, and the first and third icons 68, 72 remain in their first state. Because at least one threshold condition has not been satisfied, the start button 76 remains in its inactive, first state. In FIG. 5, the seat switch 40 is also in its second state, which is shown by the first icon 68 having changed to its second state. However, because the second throttle lever 26 has not been moved to neutral, as shown by icon 72 remaining in its first state, a threshold condition is not satisfied and the start button 76 remains in its inactive, first state. Finally, in FIG. 6, the second throttle lever 26 has also been moved to neutral, all three threshold conditions are satisfied, all three icons 68-72 are in their second states, and the start button 76 is correspondingly changed to its second state. The user can now actuate the start button 76 to start the engine 23.

In this way, the user can determine what condition(s) have been satisfied and what other conditions need to be satisfied prior to starting the engine 23. This will reduce user confusion and user complaints about the mower 10 not starting or being difficult to start such as because the user has not moved one throttle lever 24 or 26 fully to the neutral position but does not realize that, or the user is standing when trying to start the mower 10 (i.e. is not seated). Further, the user can determine if the engine 23 is not starting because a sensor or switch is not functioning correctly, if the user has taken the necessary step(s) to satisfy a threshold condition yet the associated icon remains in its first state indicating that the condition is not satisfied. In that instance, the user can repair the mower or have someone else do so.

The electronic device 60 may also provide a way for a user to enter a security or pass code to permit access to the threshold condition/starting screen, such as by entering a code by touching different areas of the display 62 or actuating buttons or switches of the electronic device. Such a code may be a threshold condition and may prevent a thief from using the mower 10 and thereby discourage theft of the mower 10. Of course, still other threshold conditions may be used, as desired for a particular application. While a zero turn lawn mower is shown and described in detail herein, the innovations may be applied to other powered devices having threshold conditions that need to be satisfied prior to an attempted action, such as, but not limited to, starting an engine. Further, while a starting procedure is shown and described, various operational parameters may be displayed to teach a user how to use the device, or for other reasons. For example, a tutorial may be provided via the screen that prompts the user to manipulate the throttle levers, engine throttle or other components in a particular way or in a particular sequence as indicted on the display, for example by changing the state of an icon, flashing or blinking an icon associated with a component to be moved, or the like. As another example, if changing the engine throttle position, a choke valve position or the like would improve engine performance, the controller may indicate the same to the user by providing such information on the display in the form of text and/or graphics/icons. Thus, the communication between the controller and the electronics device may improve operation of the device beyond the starting of the engine.

It is to be understood that the foregoing description is not a definition of the invention, but is a description of one or more preferred embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, a method having greater, fewer, or different steps than those shown could be used instead. All such embodiments, changes, and modifications are intended to come within the scope of the appended claims.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A system for communicating threshold conditions for use of a powered device to a user, comprising:
   an engine;
   a controller coupled to the engine to control starting of the engine;
   a first indicator associated with a first threshold condition, the first indicator has a first state when the threshold condition is not satisfied and the first indicator has a second state when the threshold condition is satisfied, and the first indicator is coupled to the controller so that the controller is responsive to a change of the state of the first indicator, and wherein the controller is adapted to provide information for display that is indicative of the state of the first indicator;

a second indicator associated with a second threshold condition, the second indicator has a first state when the second threshold condition is not satisfied and the second indicator has a second state when the second threshold condition is satisfied, and the second indicator is coupled to the controller so that the controller is responsive to a change of the state of the second indicator, and wherein the controller is adapted to provide information for display that is indicative of the state of the second indicator; and a throttle control including two throttle levers that are each movable between a first position and a second position and wherein the first indicator is associated with a first throttle lever of the two throttle levers and the first indicator is in the first state when the first throttle lever is in the first position and the first indicator is in the second state when the first throttle lever is in the second position, and the second indicator is associated with a second throttle lever of the two throttle levers and the second indicator is in the first state when the second throttle lever is in the first position and the second indicator is in the second state when the second throttle lever is in the second position.

2. The system of claim 1 wherein the first position of both the first throttle lever and the second throttle lever permits powered movement of the device and the second position of both the first throttle lever and the second throttle lever is a neutral position wherein the throttle control does not cause movement of the powered device.

3. The system of claim 1 which also includes an electronic device having a display that is connected with the controller to provide visual information from the controller and wherein the display includes an icon having a first state when the first indicator is in the first state and the icon has a second state when the first indicator is in the second state.

4. The system of claim 1 wherein the electronic display is a touch sensitive display and wherein a start input is provided on the display for selection by touching a corresponding portion of the electronic display, and the start input is not enabled so that touching said corresponding portion of the electronic display does not initiate a start event when the threshold condition is not satisfied and the start input is enabled when the threshold condition is satisfied so that touching said corresponding portion of the electronic display does initiate a start event.

5. The system of claim 4 wherein multiple indicators are provided and each indicator is associated with a different threshold condition, and wherein the start input is not enabled when any one of the threshold conditions is not satisfied and is enabled when all threshold conditions are satisfied.

6. The system of claim 1 wherein a third indicator is responsive to the position of a key which is movable from a first position in which the threshold condition is not satisfied to a second position in which the threshold condition is satisfied.

7. The system of claim 5 which also includes an electronic device having a display that is connected with the controller to provide visual information from the controller and wherein the display includes an icon for each of the multiple indicators, and each icon has a first state when the first indicator is in the first state and the icon has a second state when the first indicator is in the second state.

8. The system of claim 7 which:
 a) includes a seat and wherein one of the multiple icons visually looks like the seat and wherein the icon that looks like the seat is in the first state when the seat is not occupied by a user and the icon that looks like the seat is in the second state when the seat is occupied by the user; or
 b) one of the multiple icons visually looks like one of the throttle levers and wherein the icon that looks like the throttle lever is in the first state when said one of the throttle levers is in a first position and the icon that looks like the throttle lever is in the second state when said one of the throttle levers is in a second position.

9. The system of claim 3 wherein the display is part of a handheld mobile device that is coupled to the controller via one or more wires or wirelessly.

10. A method of controlling starting of an engine of or powered moving a powered device, comprising:
 providing at least one indicator associated with a threshold condition, the indicator having a first state when the threshold condition is not satisfied and a second state when the threshold condition is satisfied;
 determining the state of the indicator at a controller coupled to the engine to control at least one parameter of engine operation;
 communicating the state of the indicator to an electronics device having a display;
 visually depicting the state of the indicator on the display with an icon having a first state when the indicator is in the first state and a second state when the indicator is in the second state;
 changing the state of the icon when the state of the switch changes as communicated from the controller to the electronics device; and
 presenting a start input that initiates an engine starting attempt when the threshold condition is satisfied, where the start input is provided on a portion of the display that is responsive to touch so that touching said portion of the display initiates an engine starting event, wherein the at least one indicator includes a first indicator that is associated with a first throttle lever of the two throttle levers, and the first indicator is in the first state when the first throttle lever is in the first position and the first indicator is in the second state when the first throttle lever is in the second position, and the at least one indicator includes a second indicator that is associated with a second throttle lever, and the second indicator is in the first state when the second throttle lever is in the first position and the second indicator is in the second state when the second throttle lever is in the second position.

11. The method of claim 10 which also includes the step of wirelessly coupling the electronics device to the controller and wherein the communication between the controller and the electronics device occurs wirelessly.

12. The method of claim 10 wherein the indicator is a switch or sensor having two positions or states.

13. The method of claim 10 wherein there are multiple threshold conditions and at least one indicator associated with each threshold condition, and wherein the start input is presented on the display only when all threshold conditions are satisfied as determined by the state of the indicators.

14. The system of claim 7 wherein the display is part of a handheld mobile device that is coupled to the controller via one or more wires or wirelessly.

15. The system of claim 8 wherein the display is part of a handheld mobile device that is coupled to the controller via one or more wires or wirelessly.

\* \* \* \* \*